(No Model.)
2 Sheets—Sheet 1.
R. B. DICK.
TRAP FOR WASH BASINS, &c.
No. 330,683.    Patented Nov. 17, 1885.
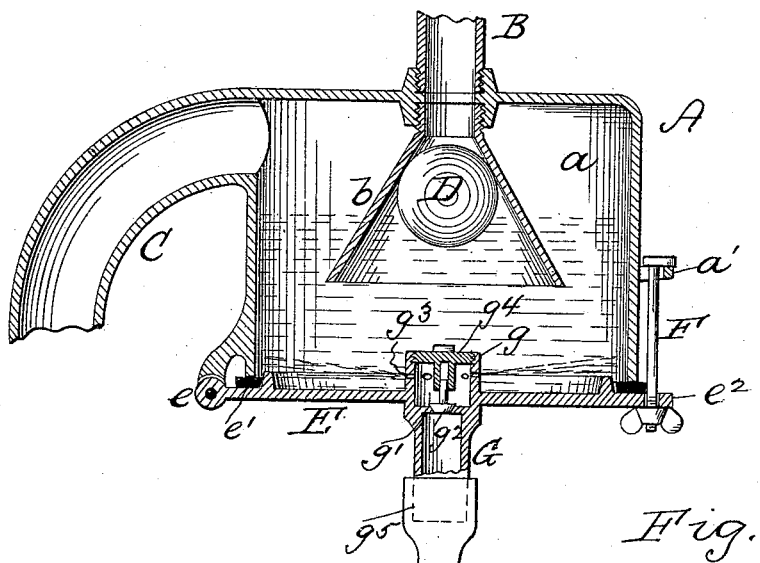
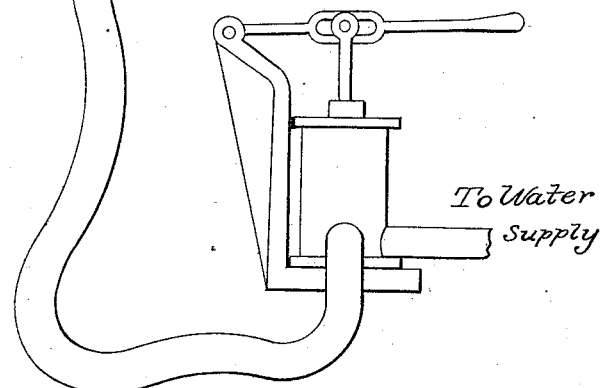
To Water Supply
Fig. I
WITNESSES:
C. W. Williams
J. W. Carr
INVENTOR
Robt. B. Dick
By S. J. Van Stavoren
ATTORNEY

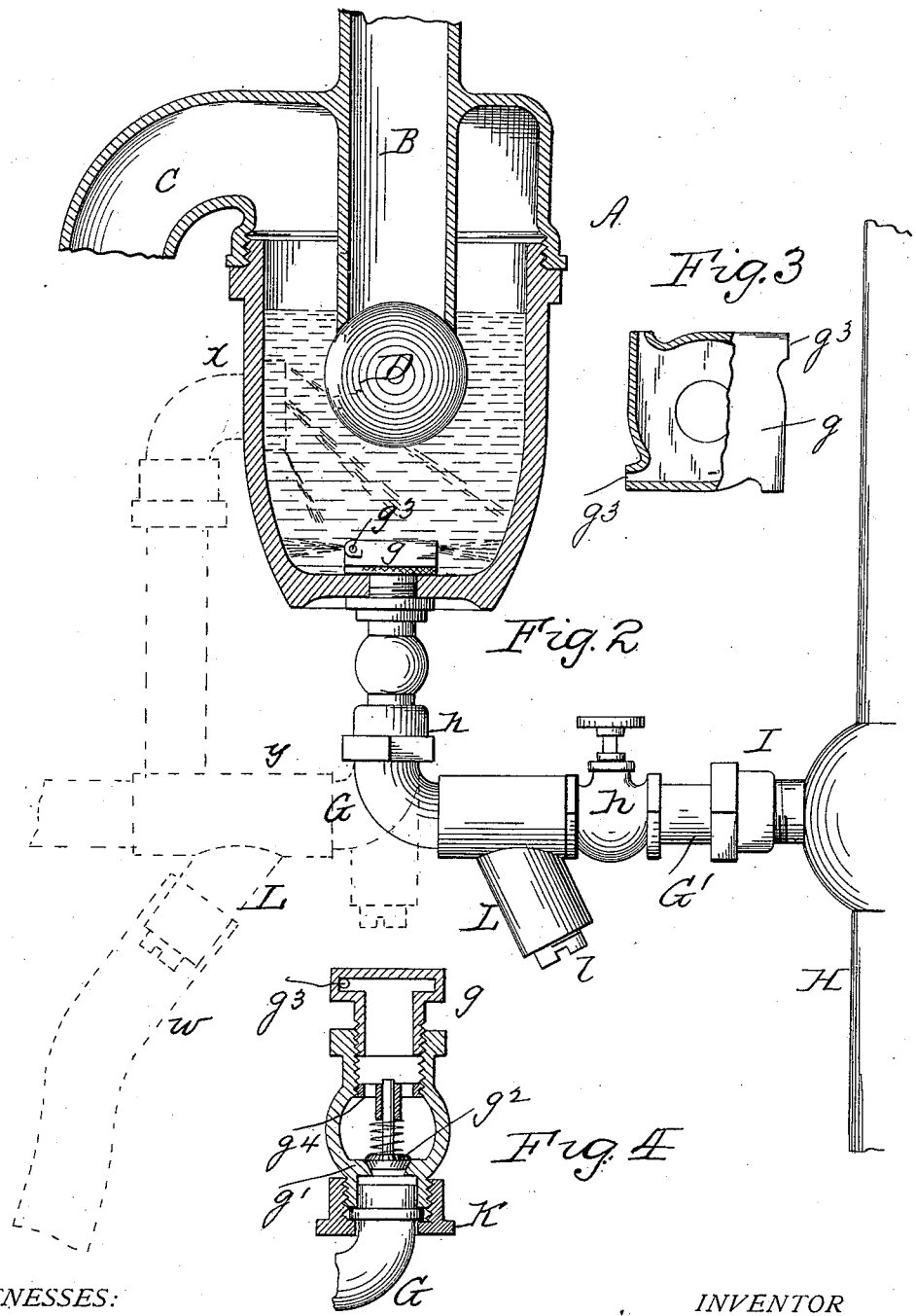

UNITED STATES PATENT OFFICE.

ROBERT B. DICK, OF PHILADELPHIA, PENNSYLVANIA.

TRAP FOR WASH-BASINS, &c.

SPECIFICATION forming part of Letters Patent No. 330,683, dated November 17, 1885.

Application filed October 28, 1884. Serial No. 146,712. (No model.)

*To all whom it may concern:*

Be it known that I, ROBERT B. DICK, a citizen of the United States, residing at Philadelphia, in the county of Philadelphia and State of Pennsylvania, have invented certain new and useful Improvements in Traps for Wash-Basins and other Like Fixtures, of which the following is a specification, reference being had therein to the accompanying drawings, wherein—

Figure 1 is a sectional elevation of a trap embodying my invention and showing the cleansing devices arranged for connection with a force-pump or detachable water-supply. Fig. 2 is a like view illustrating the cleansing devices permanently attached to or connected with the water-supply pipe for the fixture to which the trap is applied. Fig. 3 is a sectional top view of the distributing-nozzle for the cleansing devices, and Fig. 4 is a sectional elevation of part of the cleansing devices.

My invention has relation to traps for lavatories, wash and bath tubs, water-closets, soil-pipes, or other like fixtures, and has for its principal object to provide the trap with permanently-attached devices whereby it may be periodically washed out or cleansed without necessitating disconnecting or detaching the trap or any of its parts; and, further, to provide a simple and inexpensive trap having a float ball or sealing valve for use in conjunction with my improved cleansing device or attachment.

My invention accordingly consists of the combination, construction, and arrangement of parts as hereinafter described and claimed, having reference particularly to a trap having a pipe-connection provided with a check-valve and terminating in a nozzle or distributer, which pipe-connection is adapted to be connected to a force-pump or to the water-supply pipe of the fixture to which the trap is applied.

In the drawings, A represents a trap, which may be of any desired kind or construction, and have a water or valve seal, or both combined. I have, however, shown my invention applied to a trap having a float-ball sealing-valve. The trap is composed of a body, $a$, of the shape and form of an inverted cup, having a centrally-located induction-pipe, B, and a side eduction-pipe, C; but these pipes may be otherwise arranged as desired. The induction-pipe B terminates in an outwardly-flaring or funnel-shaped end, $b$, which forms a seat for the float-valve D, and also serves for a chamber to confine the valve in position or to limit the extent of its movement, so that it is always in line with and readily returns to its seat after it is moved therefrom by water passing through the trap. The flaring end $b$ preferably extends to near the bottom E of the trap, as shown.

The bottom E is hinged at $e$ to the trap-body, and between the latter and the former is placed a gasket or washer, $e'$, to provide a water-tight joint between said parts. The bottom E is held in place by a set-screw or bolt, F, which engages with a lug, $a'$, on the trap-body $a$, and with an extension, $e^2$, on bottom E, as shown.

The bottom E is formed or provided with a pipe, G, the end $g$ of which extends above the inner side of bottom E or into the trap-body, and has a seat, $g'$, for a check-valve, $g^2$, a series of perforations, $g^3$, in its walls, suitably arranged as desired, and an upper closed end, $g^4$, having a guide for valve $g^2$, as shown. The check-valve $g^2$ is normally closed by its gravity or by the action of a spring to prevent the water in trap-body $a$ escaping through the perforations $g^3$ to pipe G, the lower or open end, $g^5$, of which is designed to be connected with a temporary or permanent water-supply for effecting a periodical cleansing of the trap without removing it from its attached fixture or disconnecting any of its parts.

The temporary supply of water may be provided for by connecting the pipe G to either a spigot on the house-supply pipe by means of a flexible tube or hose or to a force-pump, as shown in Fig. 1.

The water or other fluid forced into the tube G opens its check-valve $g^2$, and thence passes through perforations $g^3$ to the trap-body $a$. The perforations $g^3$ divide such water into a number of jets, which, accordingly as the inclination and disposition of each perforation is arranged, strike or impinge against the inner wall of the trap-body and parts located therein, and by the force of impact remove all adhering accumulations or incrustations and effectually wash out or cleanse the trap and also the eduction or waste-pipe.

Instead of coupling the pipe G to the bottom of the trap, it may be secured to one of its sides, as indicated by dotted lines $x$, Fig. 2, or otherwise located, as desired.

To provide a permanent supply of cleansing-water for pipe G, it is furnished with a branch or continuation, G', which connects with the house or fixture supply-pipe H, as illustrated in Fig. 2. Swivel joints or ends I and K are provided for pipe G' for permitting it to be readily uncoupled when desirable to do so, and also to enable it to be easily adjusted or moved to different positions to accommodate any location of pipe H, as indicated by dotted lines $y$, Fig. 2.

Pipe G is provided with a stop-cock, $h$, to admit water to and cut it off from pipe G to effect the periodical cleansing of the trap.

Branch G' may, if desired, be supplied with a branch, L, having a removable screw-stopple, $l$, for attachment of a coupling pipe or hose (indicated by dotted lines $w$, Fig. 2) of a force-pump to be used for cleansing the trap when the water for pipe H is temporarily cut off or otherwise, as desired.

The distributing end or nozzle $g$ of pipe G may be configured as shown in Fig. 3 or otherwise constructed, as desired, and instead of placing the check-valve $g^2$ in said nozzle, as shown in Fig. 1, said valve may be separate from and screwed to the lower end of pipe G, as represented in Figs. 2 and 4, or it may be a stop-cock, if desired.

While I have shown my improvements, especially the cleansing attachment, applied to traps having a sealing float ball or valve, I do not limit myself thereto, as it is evident that such attachment can be applied to any and every form of trap; neither do I confine myself to the particular construction and location of the cleansing attachment, as it may be variously constructed and located without departing from the spirit of my invention.

What I claim is:—

1. A trap for wash-stands and other like fixtures, having a permanently-attached pipe, G, terminating in a nozzle, $g$, and having a check-valve, $g^2$, substantially as and for the purpose set forth.

2. The combination, with a trap, of a permanently-attached pipe, G, having nozzle $g$, valve $g^2$, and branch G', having cock $h$, substantially as and for the purpose set forth.

3. The combination, with a trap, of pipe G, having nozzle $g$, valve $g^2$, and branch G', having swiveled ends, and cock $h$, substantially as shown and described.

4. A trap having pipe G, provided with a nozzle, $g$, and valve $g^2$, a branch, G', having cock $h$, and branch L, having stopple $l$, as and for the purpose specified.

In testimony whereof I affix my signature in presence of two witnesses.

ROBERT B. DICK.

Witnesses:
JOHN RODGERS,
S. J. VAN STAVOREN.